United States Patent [19]
Yamashita

[11] Patent Number: 5,946,978
[45] Date of Patent: Sep. 7, 1999

[54] CABLE ADJUSTMENT DEVICE

[75] Inventor: Kazuhisa Yamashita, Sakai, Japan

[73] Assignee: Shimano Inc., Osaka, Japan

[21] Appl. No.: 08/969,606

[22] Filed: Nov. 13, 1997

[51] Int. Cl.⁶ ............................... F16C 1/10; G05G 11/00
[52] U.S. Cl. ......................... 74/502.2; 74/489; 74/527; 188/24.1; 474/80
[58] Field of Search ..................... 74/489, 527, 502.4, 74/501, 502.5, 502.2; 188/196 F, 196 R, 24.1, 24.11, 2 D; 474/112, 80

[56] References Cited

U.S. PATENT DOCUMENTS

| | | | |
|---|---|---|---|
| 2,434,358 | 1/1948 | Frank | 174/84 |
| 2,821,277 | 1/1958 | Hughes | 192/67 |
| 3,222,772 | 12/1965 | Leyner | 29/447 |
| 3,546,962 | 12/1970 | Ruhala | 74/501 |
| 3,580,102 | 5/1971 | Wrabetz et al. | 74/501 |
| 3,759,352 | 9/1973 | Toplis | 188/24 |
| 3,808,908 | 5/1974 | Guerr | 74/489 |
| 3,811,338 | 5/1974 | Federspiel | 74/527 |
| 3,960,032 | 6/1976 | Schiff | 74/501 R |
| 3,997,030 | 12/1976 | Yoshigai | 74/489 X |
| 4,238,975 | 12/1980 | Jones | 74/502 |
| 4,334,438 | 6/1982 | Mochida | 74/501 R |
| 4,543,849 | 10/1985 | Yamamoto et al. | 74/501 R |
| 4,591,026 | 5/1986 | Nagano | 188/2 D |
| 4,833,937 | 5/1989 | Nagano | 74/501.5 R |
| 4,909,094 | 3/1990 | Yoshigai | 74/502.4 X |
| 5,564,311 | 10/1996 | Chen | 74/502.2 X |
| 5,660,082 | 8/1997 | Hsieh | 74/502.2 |
| 5,674,142 | 10/1997 | Jordan | 74/502.4 X |
| 5,778,729 | 7/1998 | Tsai | 74/502.2 X |

FOREIGN PATENT DOCUMENTS

| | | | |
|---|---|---|---|
| 246575 | 10/1947 | Germany | 74/502.2 |
| 2827742 | 1/1979 | Germany . | |
| 4222573 | 12/1964 | Japan . | |
| 50-43647 | 4/1975 | Japan . | |
| 53-6928 | 2/1978 | Japan . | |
| 57-193413 | 12/1982 | Japan . | |
| 57-205260 | 12/1982 | Japan . | |
| 250793 | 7/1995 | Taiwan . | |
| 2016634 | 9/1979 | United Kingdom . | |
| 8401196 | 3/1984 | WIPO . | |

OTHER PUBLICATIONS

Photographs of Shimano Deore XT brake lever, sold prior to Nov. 13, 1997.

*Primary Examiner*—Tamara L. Graysay
*Assistant Examiner*—Marcus Charles
*Attorney, Agent, or Firm*—Shinjyu Global IP Counselors, LLP

[57] ABSTRACT

A cable adjustment device changes the effective length or tension of a control cable which extends between an actuating mechanism and a device to be operated thereby. In the case of a bicycle, the cable adjustment device is coupled to a bicycle actuating mechanism such as a brake lever or a shifter to control a brake or a derailleur. The actuating mechanism has a base or stationary member and a movable member coupled to the base member for moving the control cable. In the preferred embodiment, the cable adjustment device is coupled to the base member. Specifically, a cable guide portion with an internal threaded bore is integrally formed with the base member. This bore threadedly receives an adjusting member which engages the outer casing of the control cable. A torsion spring is coupled between the adjusting member and the cable guide portion to overridably restrict rotational movement therebetween. Specifically, the adjusting member has one or more longitudinally extending channels which are selectively engaged by a nose portion of the torsion spring to control the rotational movement of the adjusting member.

17 Claims, 5 Drawing Sheets

CABLE ADJUSTMENT DEVICE

BACKGROUND OF THE INVENTION

1. Field of the Invention

This invention generally relates to a cable adjustment device especially for a bicycle operating mechanism. More specifically, the present invention relates to cable adjustment device which allows for quick and easy adjustment of the effective length or tension of cable extending between a bicycle actuating mechanism (lever or shifting member) and a bicycle braking mechanism or derailleur.

2. Background Information

Bicycle control cables are interposed between actuating mechanisms, such as a brake lever or a shifter and its braking mechanism or derailleur. For example, when the brake lever is pulled, the inner wire of the control cable moves within the outer casing of the control cable to move the brake shoes from a disengaged position to a braking position in which the brake shoes engage the rim of the wheel. In the case of a derailleur, the shifter moves the inner wire of the control cable relative to the outer casing of the control cable such that the derailleur moves relative to the gears.

In particular, brake actuating mechanisms usually include a brake lever mounted to a base member for pivotal movement. The base member is typically mounted to a handlebar of a bicycle. A control cable extends from the braking mechanism to the brake lever. The brake lever pivots between a brake engagement position and a brake disengagement position. In the brake engagement position, the cable is pulled by the brake lever so that the cable moves brake shoes into engagement with corresponding bicycle tire rim to stop tire rotation of the tire. In the brake disengagement position, the cable tension is released and the braking mechanism is disengaged.

Typically, in the brake disengagement position, the brake lever and control cable are adjusted to allow the brake shoes to be spaced apart from the tire rim by only a small distance. This spacing can be adjusted by a threaded barrel adjustment which engages the outer casing of the control cable to change the effective length or tension of the cable between the barrel and the braking mechanism. Similarly, the shifter and control cable can be adjusted by a threaded barrel adjustment which engages the outer casing of the control cable to change the effective length or tension of the cable between the barrel and the shifter. The effective length or tension of the shift cable is adjusted to hold the chain on the correct sprocket or gear as well as to move the chain from gear to gear.

In the past, a locking nut was used to maintain the barrel adjustment to a particular setting. Often times, a tool was required to loosen the locking nut. More recently, various cable adjustment devices have been developed to maintain the barrel adjustment. These newer cable adjustment devices are often complex and/or expensive to manufacture. Some examples of cable adjustment devices are disclosed in U.S. Pat. Nos. 4,591,026 to Nagano; 4,833,937 to Nagano; and 5,674,142 to Jordan.

In view of the above, there exists a need for a cable adjustment device which is easily adjustable and inexpensive to manufacture. This invention addresses this need in the art as well as other needs in the art which will become apparent to those skilled in the art from this disclosure.

SUMMARY OF THE INVENTION

One object of the present invention is to provide a brake lever arm with an adjustment mechanism which allows for adjustment of the distance between brake shoes and a corresponding bicycle tire rim without the use of tools.

Another object of the present invention is to provide a brake lever arm with an adjustment mechanism which allows for rapid adjustment of the distance between brake shoes and a corresponding bicycle tire rim.

Another object of the present invention is to provide cable adjustment devices which can be used with existing actuating mechanisms such as brake levers and shifting devices without significant modification thereto.

Still another object of the present invention is to provide a cable adjustment device which is relatively inexpensive to manufacture.

The foregoing objects can basically attained by providing a cable adjustment device comprising: a base member having a cable guide portion with a first open end, a second open end and a first bore extending longitudinally therebetween; an adjusting member having tubular portion with a third open end, a fourth open end and a second bore extending longitudinally therebetween, the adjusting member being rotatably coupled to the cable guide portion for axial movement during relative rotational movement between the tubular portion of the adjusting member and the cable guide portion of the base member; and an indexing spring disposed between the base member and the adjusting member in a cantilevered arrangement, with a first section of the spring being nonmovably engaged with one of the members, and a second section of the spring having a free end movable coupled to the first section to move in a transverse direction to the axial movement of the adjusting member, the second section of the spring being normally biased to movably engage a longitudinally extending channel formed in one of the members to overridably restrict rotational movement between the members.

Other objects, advantages and salient features of the present invention will become apparent to those skilled in the art from the following detailed description, which, taken in conjunction with the annexed drawings discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
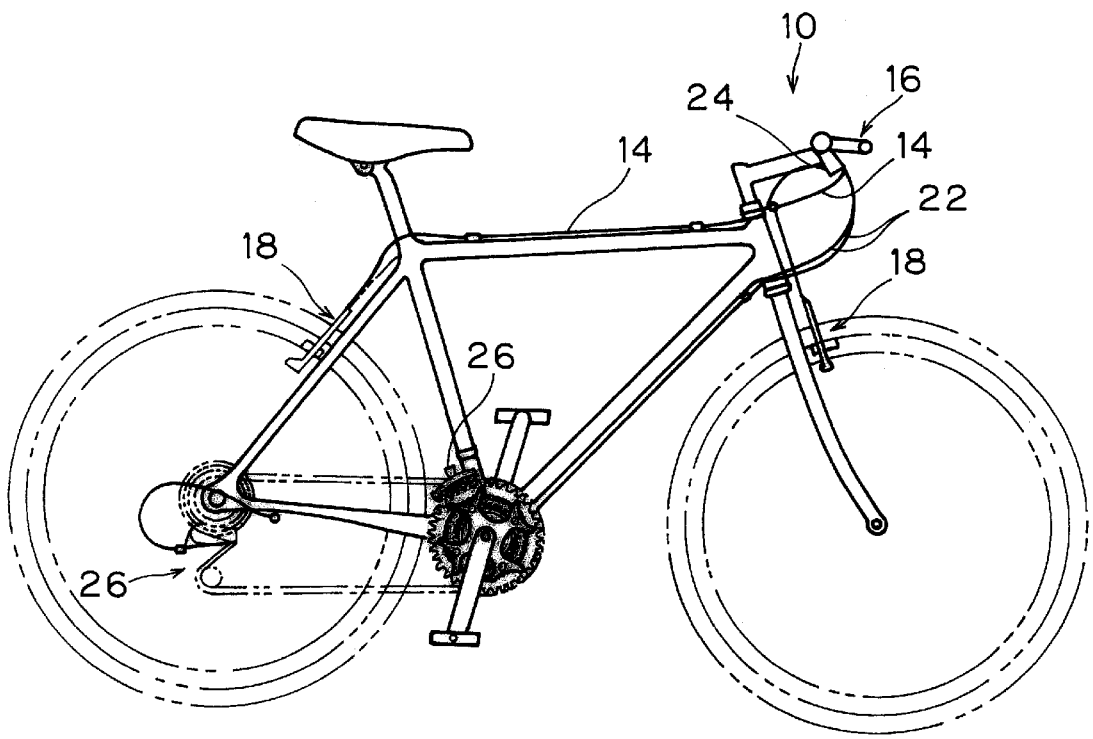
FIG. 1 is a side elevational view of a bicycle which employs cable adjustment devices in accordance with the present invention.
Figure 2:
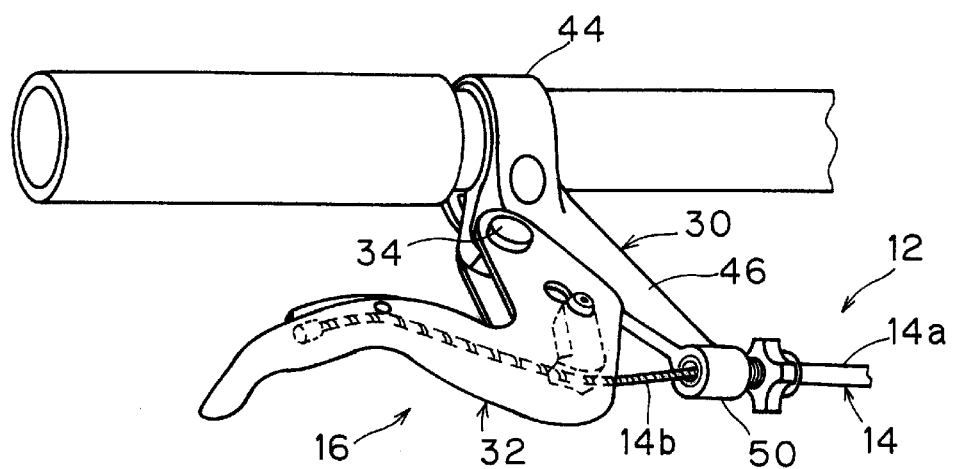
FIG. 2 is a perspective view of the bicycle braking mechanism having a cable adjustment device in accordance with the present invention.
Figure 12:
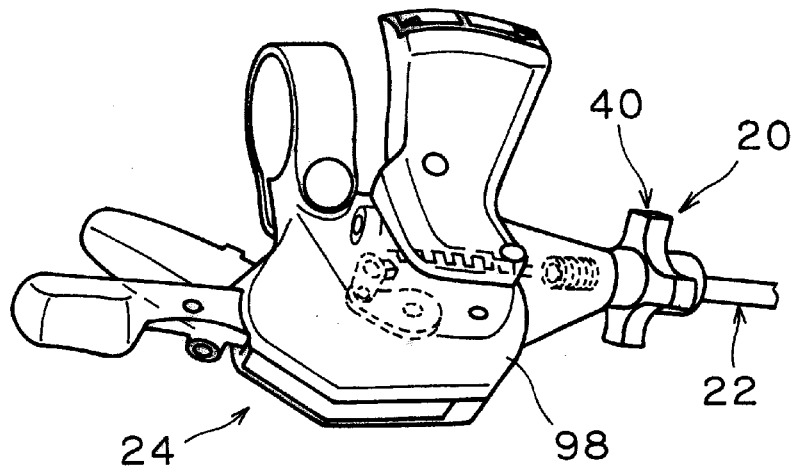
FIG. 12 is a perspective view of a shift actuating device incorporating a cable adjustment device in accordance with the present invention.

Referring initially to FIGS. 1, 2 and 12, a bicycle 10 is illustrated which employs a first pair of cable adjustment devices 12 (one shown in FIG. 2) in accordance with the present invention for adjusting the effective length or tension of brake cables 14 which extends between front and rear bicycle brake actuating mechanisms 16 and front and rear bicycle braking mechanisms 18, and a second pair of cable adjustment devices 20 (one shown in FIG. 12) in accordance with the present invention for adjusting the effective length or tension of shift cables 22 extending between bicycle shift actuating mechanisms 24 and front and rear derailleurs 26. Typically, cable adjustment devices 12 form an integral part of brake actuating mechanisms 16 as seen in FIG. 2, while cable adjustment devices 20 form an integral part of shift actuating mechanisms 24 as seen in FIG. 12.

Figure 8:
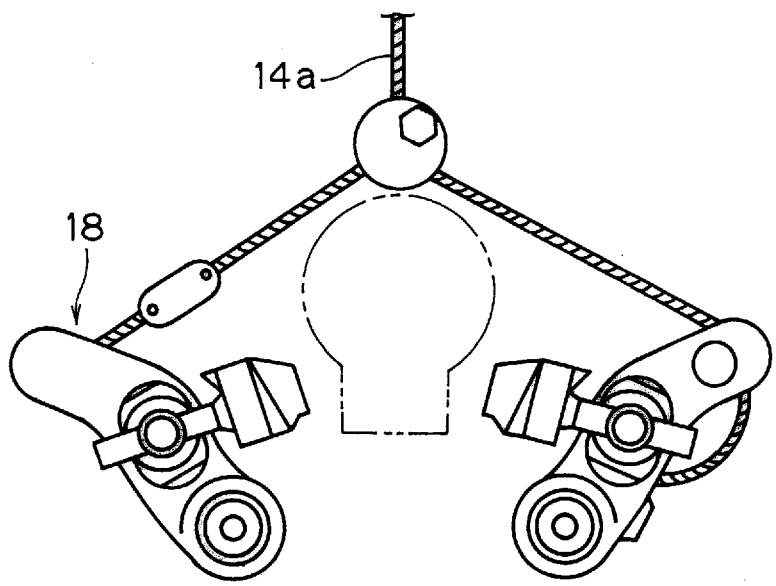
FIG. 8 is a front view of a bicycle braking mechanism which is controlled by the bicycle brake actuating mechanism illustrated in FIGS. 1–7 with its brake shoes in a brake disengagement position corresponding to the configuration of the brake lever depicted in FIGS. 2 and 3.
Figures 9, 10, 11:
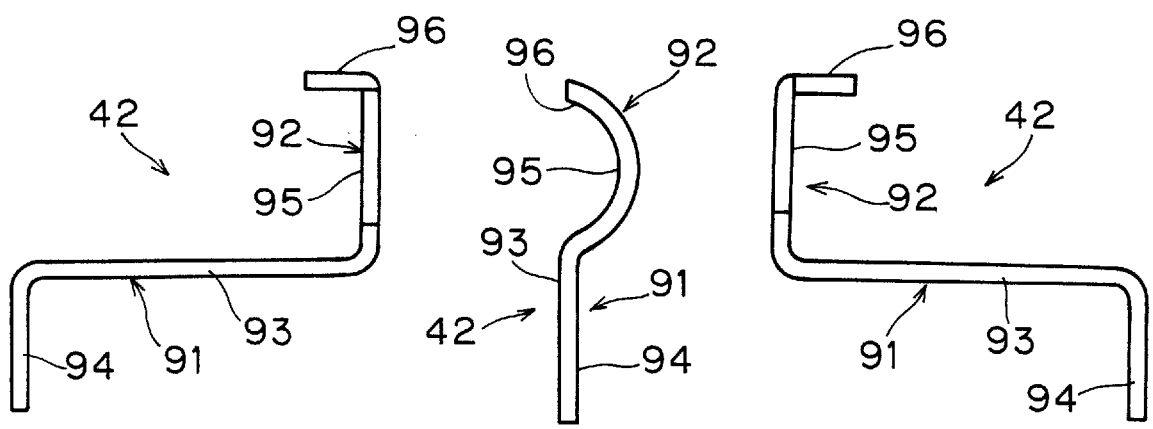
FIG. 9 is an enlarged top plan view of the indexing spring for use with the cable adjustment device illustrated in FIGS. 2–7.
FIG. 10 is an enlarged, end elevational view of the indexing spring used with the cable adjustment device illustrated in FIGS. 2–7 in its undeflected position.
FIG. 11 is a bottom plan view of the indexing spring for the cable adjustment device illustrated in FIGS. 2–7.

Bicycle 10 and its various components as seen in FIGS. 1, 8 and 10 are conventional components which are well-known in the art, except that the brake actuating mechanisms 16 and the shift actuating mechanisms 24 have been modified to accommodate cable adjustment devices 12 and 20 of FIGS. 2 and 12 as discussed herein below. Accordingly, the various conventional bicycle components of bicycle 10 will not be discussed or illustrated in detail herein.

Moreover, front and rear brake actuating mechanisms 16 are substantially the same, except that they are typically mirror images of each other. Likewise, braking mechanisms 18 are conventional components which can be either the same or different. Therefore, brake actuating mechanisms 16 and braking mechanisms 18 will also not be discussed in detail herein. Likewise, the basic constructions of shift actuating mechanisms 24 and their respective derailleurs 26 are well-known in the art. Thus, these parts will not be discussed or illustrated in detail herein, except as they are modified to include a cable adjustment device 20 in accordance with the present invention.

Figure 3:
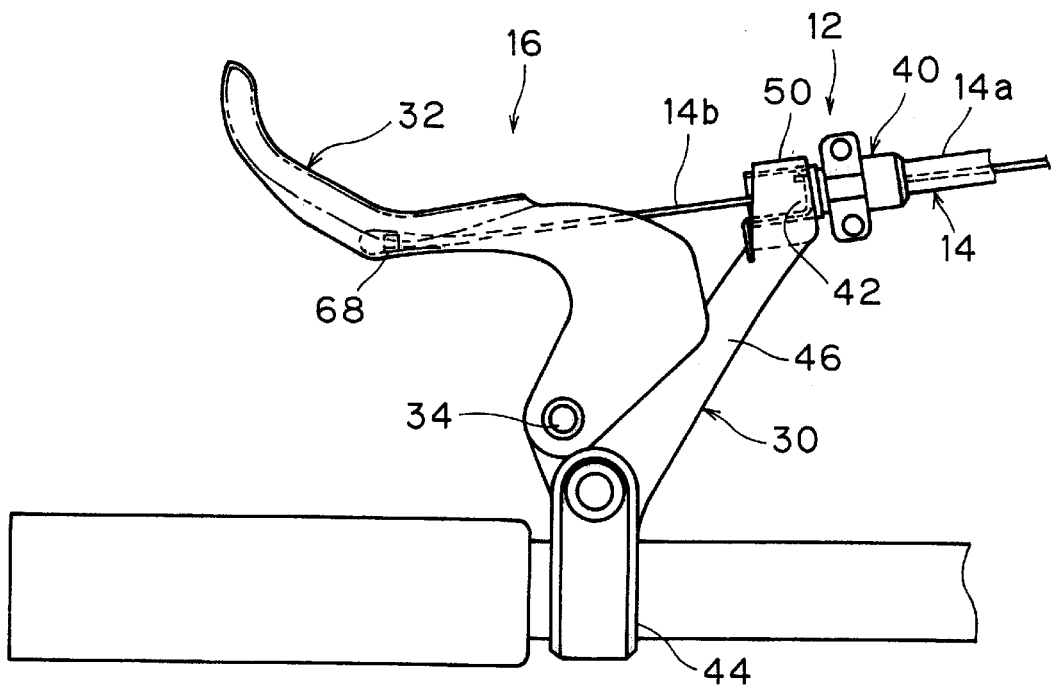
FIG. 3 is a plan view of the bicycle brake actuating mechanism illustrated in FIG. 2 with the cable adjustment device in accordance with the present invention.
Figure 4:
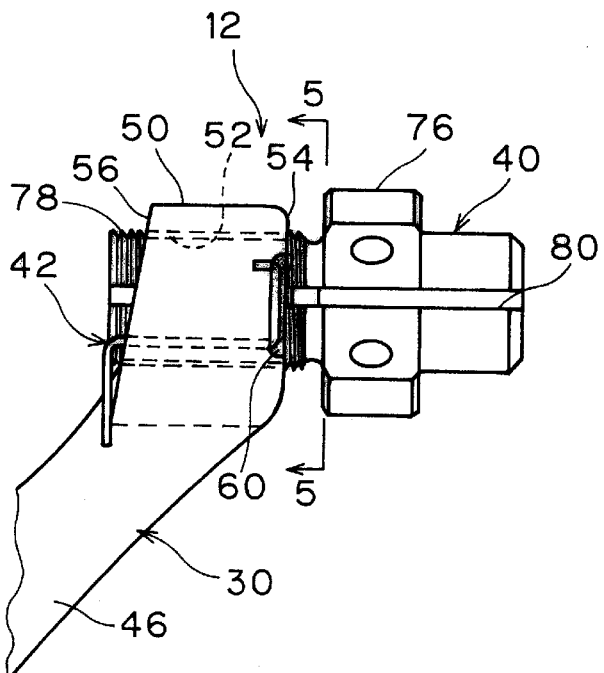
FIG. 4 is an enlarged, partial plan view of the cable adjustment device illustrated in FIGS. 2 and 3 in accordance with the present invention and with the control cable removed.

In the case of brake actuating mechanisms 16, each cable adjustment device 12 controls the effective length or tension of cable 14 between brake actuating mechanism 16 and the braking mechanism 18 by moving the outer casing 14a of cable 14 relative to inner wire 14b. As seen in FIGS. 2 and 3, each brake actuating mechanism 16 includes a stationery or base member 30 which is fixed to the handlebar of the bicycle 10 and a brake lever 32 movably or pivotally coupled to base member 30. Typically, the brake lever 32 is spring biased to an open position such that the brake lever 32 pivots in a clockwise direction around the pivot pin 34 as seen in the figures. The cable adjustment device 12 is formed as part of the base member 30 as explained below, and includes an adjusting member 40 and an indexing spring 42. The general construction and operation of brake actuating mechanisms 16 are generally old and well-known, and thus, will not be discussed or illustrated in detail herein.

As seen in FIGS. 2 and 3, base member 30 has a clamping portion 44 located at one end for securing the brake actuating mechanism 16 to the handlebar of the bicycle 10. A center portion 46 extends outwardly from the clamping portion 44 and has a hole (not shown) for receiving the pivot pin 34 to pivotally couple the brake lever 32 thereto. At the free end of the center portion 46 is an enlarged section forming a cable guide portion 50.

Figure 6:
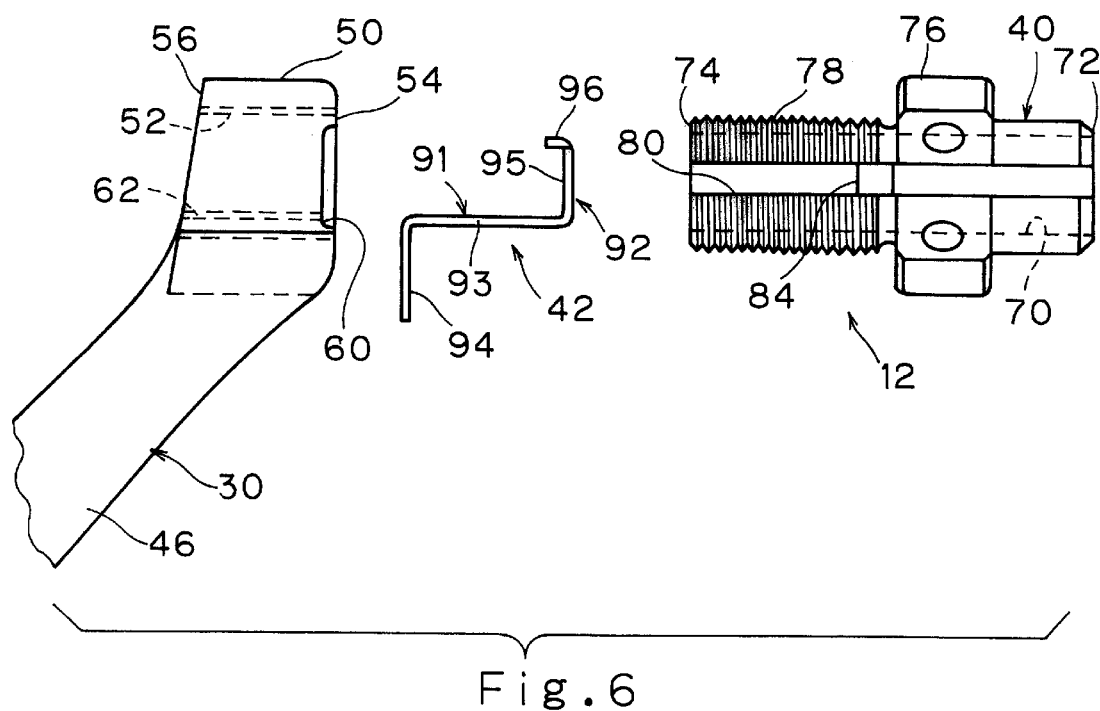
FIG. 6 is an exploded plan view of the cable adjustment device illustrated in FIGS. 2–5 in accordance with the present invention.
Figure 7:
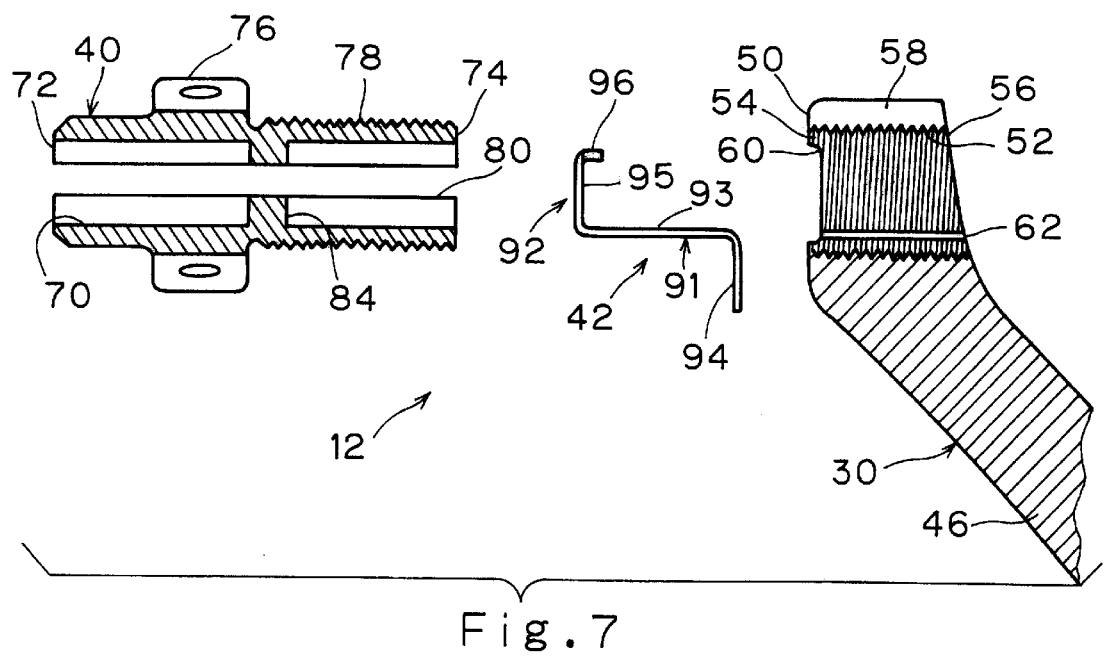
FIG. 7 is a longitudinal cross-sectional view of the cable adjustment device illustrated in FIGS. 2–7 as seen along section line 7–7 of FIG. 5.

As seen in FIGS. 6 and 7, cable guide portion 50 is a tubular member having a threaded inner bore 52 extending longitudinally therethrough with a first open end 54 and a second open end 56. Adjusting member 40 is threadedly received in bore 52 of cable guide portion 50 for axial movement therein. Preferably, cable guide portion 50 is split to have a passageway or channel 58 extending longitudinally therealong and in communication with the threaded bore 52. This passageway or channel 58 allows the control cable 14 to pass transversely into the threaded bore 52 of cable guide portion 50. Clearly, if this passageway 58 was omitted, then the brake or control cable 14 would have to be inserted longitudinally through threaded bore 52 of cable guide portion 50 for installing and coupling the brake cable 14 to brake lever 32.

Figure 5:
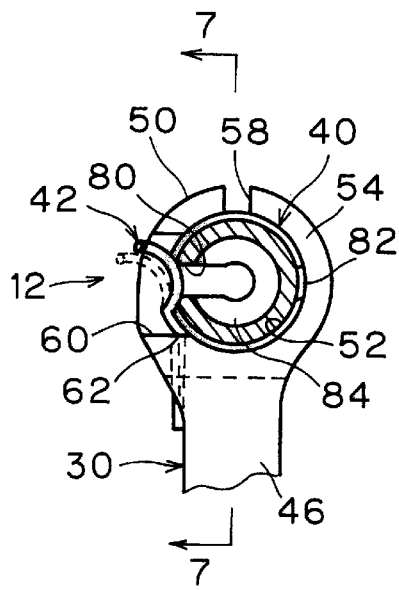
FIG. 5 is a transverse cross-sectional view of the cable adjustment device illustrated in FIG. 4 as viewed along section line 5—5 of FIG. 4.

Preferably, the first open end 54 of cable guide portion 50 has a notch 60 for receiving a part of indexing spring 42 therein as explained below. As seen in FIGS. 5–7, threaded bore 52 of the cable guide portion 50 also has a longitudinally extending slot 62 for receiving the longitudinal portion of the first section of the indexing spring 42 therein. This longitudinal slot 62 has a depth such that the indexing spring 42 is recessed therein without interfering with the adjusting member 40.

Referring again to FIGS. 2 and 3, brake lever 32 is a relatively conventional lever having its inner end pivotally coupled to base member 30 via the pivot pin 34 which is located along center portion 46 of the base member 30. The outer free end of the brake lever 32 forms a finger or hand portion for grasping the brake lever 32 to move the brake lever 32 from a brake disengaged position to a brake engaging position. The brake lever 32 also has a cable connection point or connector 68 for fixedly coupling one end of cable 14 thereto. This cable connector 68 can take a variety of forms which are old and well-known in the art. Thus, the specific cable connection will not be shown or illustrated herein. Rather, it will be apparent to those skilled in the art from this disclosure that any type of known or new cable connector can be utilized.

As seen in FIGS. 6 and 7, adjusting member 40 is a tubular member having a central bore 70 extending longitudinally between a first open end 72 and a second open end 74. Adjusting member 40 is preferably provided with a knob portion 76 to assist the user in the turning of the adjusting member 40 relative to the cable guide portion 50 of base member 30. In the preferred embodiment, the knob portion 76 has four outwardly extending flanges. Of course, it will be apparent to those skilled in the art from this disclosure that the knob portion 76 can take a variety of shapes. Of course, in the most preferred embodiment, the knob portion 76 should be constructed such that the rider can easily turn the adjusting member 40 without a tool. Of course, it is possible to construct the knob portion 76 such that it requires a tool.

Second open end 74 of adjusting member 40 is provided with a section of external threads 78 for threadedly mating with the internal threads of bore 52 of the cable guide portion 50. Accordingly, rotation of the adjusting member 40 relative to the cable guide portion 50 causes the adjusting member 40 to move axially or longitudinally within bore 52 of cable guide portion 50 of the base member 30. Alternatively, it will be apparent to those skilled in the art that cable guide portion 50 can be provided with external threads and adjusting member 40 can be provided with internal threads to provide the desired movement therebetween.

Preferably, the adjusting member 40 has a longitudinally extending passageway or channel 80 which extends radially therethrough and communicates with longitudinally extending bore 70. This passageway 80 performs two functions. First, the passageway 80 allows the brake cable 14 to pass therethrough such that the brake cable 14 does not have to be threaded longitudinally through the central bore 70. Second, this passageway 80 acts as a channel for engaging the indexing spring 42 such that each time the indexing spring 42 engages the passageway or channel 80, the adjusting member 40 is overridably restricted from rotational movement relative to the cable guide portion 50.

Accordingly, the indexing spring 42 cooperates with this passageway 80 such that the adjusting member 40 will be overridably restricted after each complete rotation. The term "overridably restrict" as used herein means that the biasing force of the indexing spring 42 restricts rotational movement of adjusting member 40 until a large rotational force is applied to override the force of the indexing spring 42. In this way, the adjusting member 40 can be incrementally rotated. Of course, additional longitudinally extending channels can be provided for adding additional indexing of the adjusting member 40. For example, as seen in FIG. 5, a longitudinal channel 82 is provided 180° from the passageway or channel 80 so that the adjusting member 40 is overridably retained at two positions. Of course, additional channels can be provided so that smaller increments of adjustments can be obtained.

As seen in FIGS. 5 and 7, internal bore 70 of the adjusting member 40 is provided with a radially inwardly extending flange 84 for engaging the outer casing or sheath 14a of the cable 14, while the inner wire 14a of the cable 14 passes therethrough and is connected to the brake lever 32 in a substantially conventional manner. Accordingly, rotation of the adjusting member 40 will cause axial movement of the outer casing or sheath 14a of the control cable 14 relative to the inner wire 14b of the control cable 14.

Referring now to FIGS. 9–11, indexing spring 42 is a substantially Z-shaped torsion spring which is preferably constructed of a spring steel or other suitable resilient material. Indexing spring 42 has a first L-shaped section 91 which non-rotatably engages the base member 30 and a second section 92 which movably engages adjusting member 40. In particular, the first section 91 of the indexing spring 42 includes a longitudinal portion 93 located within the longitudinally extending slot 62 of the threaded bore 52 and a transverse stop portion 94 which engages a part of the base member 30. Accordingly, when the second portion 92 is moved by the adjusting member 40, the longitudinal portion 93 which engages base member 30 is torsionally twisted about its axis since it is restrained from turning by the transverse section 94.

As seen in FIGS. 5 and 10, second section 92 of the index spring 42 has a curved nose portion 95 which forms the detent of the indexing spring 42 for selectively engaging the channels 80 and 82 of the adjusting member 40. Second section 92 also has a short longitudinally extending stop portion 96 at its free end for engaging the exterior of the cable guide portion 50 of the base member 30. Second section 92 extends substantially perpendicular to bore 52 of cable guide portion 50, and is located in notch 60 of cable guide portion 50 with stop portion 96 overlying the exterior surface of cable guide portion 50. Accordingly, second section 92 is cantilevered relative to longitudinal portion 93 of first section 91. In other words, second section 92 of index spring 42 extends from first section 91 of index spring 42 with a free end (at stop portion 96) of second section 92 being movably coupled relative to first section 91 to move in a transverse direction to the axial movement of the adjusting member 40. This arrangement of first and second sections 91 and 92 results in second section 92 being cantilevered relative to the longitudinal portion 93 of first section 91.

During use, the second section 92 is resiliently deflected in a direction substantially transverse to the direction of longitudinal movement of adjusting member 40 such that stop portion 96 at the free end of the second section 92 of the spring 42 is normally spaced from cable guide portion 50 so that second section 92 is freely movable. In other words, the stop portion 96 of the second section 92 of the indexing spring 42 does not normally engage the exterior surface of the cable guide portion 50 when the adjusting member 40 is coupled to the cable guide portion 50.

The length of second section 92 of indexing spring 42 is less than the length of the longitudinal portion 93 of the first section 91 of the indexing spring 42 to create a spring rate with a small spring modulus. Thus, the stroke of the spring 42 is freely movable without becoming weaker.

In use, when the rider wants to adjust the effective length or tension of the cable 14 between the brake actuating mechanism 16 and the braking mechanism 18, the rider will rotate the adjusting member 40 via the knob portion 76. This rotation of adjusting member 40 will cause the external threads 78 of adjusting member 40 to engage the internal threads 52 of the cable guide portion 50 to cause relative axial movement of the adjusting member 40 relative to the cable guide portion 50. As mentioned above, rotation of the adjusting member 40 engages the outer sheath or casing 14a of the control cable 14 to adjust the effective length or tension of the control cable 14 between the brake actuating mechanism 16 and the braking mechanism 18.

During this rotation of the adjusting member 40, the nose portion 95 of the indexing spring 42 will be deflected or biased radially outwardly from one of the channels 80 or 82 and then ride along the exterior surface or threads 78 of the adjusting member 40. Typically, the adjusting member 40 is rotated until the nose portion 95 engages either the same channel or another channel formed longitudinally along the threads 78 of the cable adjusting member 40. When the nose portion 95 of the spring 42 engages one of the channels 80 or 82, the relative rotational movement of the adjusting member 40 relative to the base member 30 is overridably restricted.

Shift Actuating Mechanism

Figure 13:
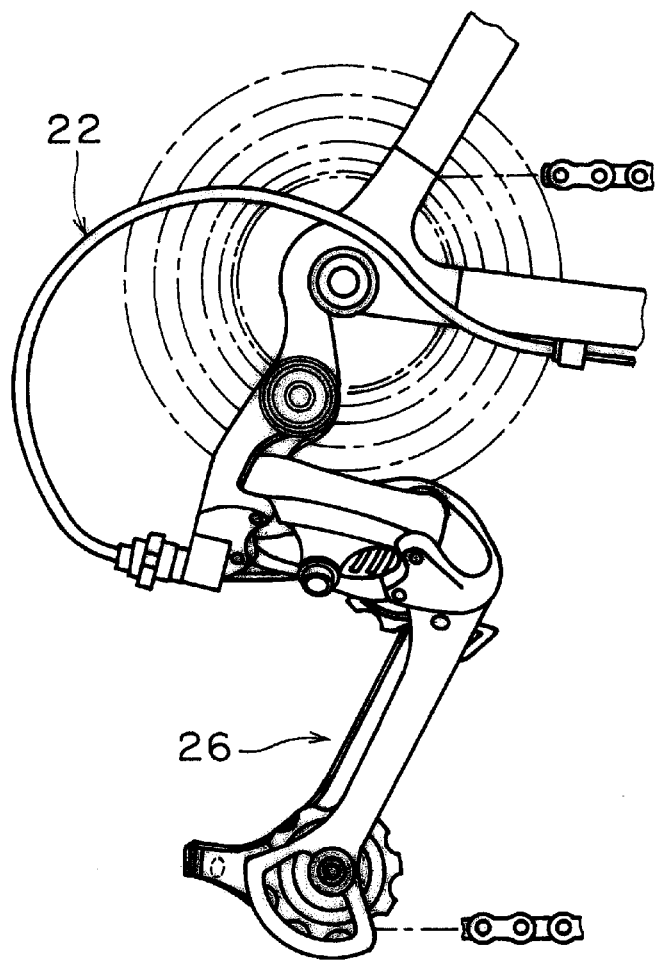
FIG. 13 is a partial side elevational view of a rear derailleur coupled to the frame of the bicycle and the control cable is coupled to the cable adjustment device of FIG. 12.

Turning now to FIGS. 12 and 13, cable adjustment device 20 is illustrated as part of a shift actuating mechanism 24.

Basically, the shift actuating mechanism 24 includes a housing or enclosure 98 which forms the cable guide portion for threadedly receiving adjusting member 40 and indexing spring 42 in substantially the same manner as discussed above. In other words, the structure described above in the brake actuating mechanism 16 is incorporated into the shift actuating mechanism 24 such that they work in substantially the same manner.

In view of the similarities between their constructions and operations, the precise construction of the shift actuating mechanism 24 will not be discussed or illustrated herein. Rather, the precise construction of the shift actuating mechanism 24 should be apparent to those skilled in the art once given this disclosure without undue experimentation. Moreover, it will be apparent to those skilled in the art that the present invention can be used with other types of shift actuating mechanisms, such as a grip shifter.

While several embodiments of the present invention have been described and illustrated, it will be apparent to those skilled in the art once given this disclosure that various modifications, changes, improvements and variations may be made without departing from the spirit or scope of this invention as defined in the following claims.

What is claimed is:

1. A cable adjustment device comprising:
    a base member having a cable guide portion with a first open end, a second open end and a first bore extending longitudinally therebetween;
    an adjusting member having tubular portion with a third open end, a fourth open end and a second bore extending longitudinally therebetween, said adjusting member being rotatably coupled to said cable guide portion for axial movement during relative rotational movement between said tubular portion of said adjusting member and said cable guide portion of said base member; and
    an indexing spring disposed between said base member and said adjusting member, with a first section of said spring being nonmovably engaged with one of said members, and a second section of said spring extending from said first section with a free end of said second section being movably coupled relative to said first section to move in a transverse direction to said axial movement of said adjusting member, said free end of said second section being cantilevered relative to said first section, said second section of said spring being normally biased to movably engage a longitudinally extending channel formed in one of said members to overridably restrict rotational movement between said members.

2. A bicycle actuating mechanism comprising:
    a base member having a cable guide portion with a first open end, a second open end and a first bore extending longitudinally therebetween;
    an actuating element having a cable attachment point adapted to couple a cable thereto, said actuating element being movably coupled to said base member;
    an adjusting member having tubular portion with a third open end, a fourth open end and a second bore extending longitudinally therebetween, said adjusting member being rotatably coupled to said cable guide portion for axial movement during relative rotational movement between said tubular portion of said adjusting member and said cable guide portion of said base member; and
    an indexing spring disposed between said base member and said adjusting member, with a first section of said spring being nonmovably engaged with one of said members, and a second section of said spring extending from said first section with a free end of said second section being movably coupled relative to said first section to move in a transverse direction to said axial movement of said adjusting member, said free end of said second section being cantilevered relative to said first section, said second section of said spring being normally biased to movably engage a longitudinally extending channel formed in one of said members to overridably restrict rotational movement between said members.

3. A bicycle actuating mechanism according to claim 2, wherein
    said spring is a torsion spring.

4. A bicycle actuating mechanism according to claim 2, wherein
    said first section of said spring includes a longitudinal portion extending longitudinally within one of said bores of one of said members.

5. A bicycle actuating mechanism according to claim 4, wherein
    said first section of said spring includes a transverse portion extending in a second direction which is substantially opposite to said first direction of said second section of said spring.

6. A bicycle actuating mechanism according to claim 4, wherein
    said first section of said spring is longer in length than said second section of said spring.

7. A bicycle actuating mechanism according to claim 2, wherein
    said second section of said spring has a bent portion for engaging said channel of one of said members.

8. A bicycle actuating mechanism according to claim 2, wherein
    said one of said members with said first channel has at least one additional longitudinally extending channel formed in one of said members and circumferentially spaced from said first channel that is selectively engaged by said second section of said indexing spring to restrict rotational movement between said members.

9. A bicycle actuating mechanism according to claim 8, wherein
    said one of said channels is a longitudinally extending slot which is in communication with said bore of said one of said members.

10. A bicycle actuating mechanism according to claim 2, wherein
    said channel is a longitudinally extending slot which is in communication with said bore of said one of said members.

11. A bicycle actuating mechanism according to claim 2, wherein
    said cable guide portion of said base member is threadedly coupled to said tubular portion of said adjusting member.

12. A bicycle actuating mechanism according to claim 11, wherein
    said bore of said base member has internal threads and said tubular portion of said adjusting member has external threads.

13. A bicycle actuating mechanism according to claim 12, wherein
    said adjusting member further includes a knob portion.

14. A bicycle actuating mechanism according to claim 2, wherein each said members includes a longitudinally extending passageway in communication with its respective said bore such that a cable can pass laterally therethrough and into said bores when said passageways are aligned.

15. A bicycle actuating mechanism according to claim 2, wherein said actuating element is a lever which is pivotally coupled to said base member.

16. A bicycle actuating mechanism according to claim 2, wherein said actuating element is a part of a shifting mechanism.

17. A bicycle actuating mechanism according to claim 2, wherein said base member includes a clamp to fixedly couple to a handle bar.

* * * * *

(12) EX PARTE REEXAMINATION CERTIFICATE (5500th)
United States Patent
Yamashita

(10) Number: US 5,946,978 C1
(45) Certificate Issued: Sep. 12, 2006

(54) CABLE ADJUSTMENT DEVICE

(75) Inventor: Kazuhisa Yamashita, Sakai (JP)

(73) Assignee: Shimano, Inc., Osaka (JP)

Reexamination Request:
No. 90/007,131, Jul. 22, 2004

Reexamination Certificate for:
Patent No.: 5,946,978
Issued: Sep. 7, 1999
Appl. No.: 08/969,606
Filed: Nov. 13, 1997

(51) Int. Cl.
*F16C 1/10* (2006.01)
*G05G 11/00* (2006.01)

(52) U.S. Cl. ............. 74/502.2; 74/489; 74/527; 188/24.11; 474/80

(58) Field of Classification Search ............. None
See application file for complete search history.

(56) References Cited

U.S. PATENT DOCUMENTS

| | | | | |
|---|---|---|---|---|
| 3,811,338 A | * | 5/1974 | Federspiel | 74/527 |
| 4,334,438 A | * | 6/1982 | Mochida | 74/502.4 |
| 5,674,142 A | * | 10/1997 | Jordan | 74/502.4 |
| 5,778,729 A | * | 7/1998 | Tsai | 74/502.2 |

FOREIGN PATENT DOCUMENTS

| | | |
|---|---|---|
| DE | GM 76 26 479 | 12/1976 |
| JP | 50-43647 | * 4/1975 |
| TW | 250793 | * 7/1995 |

* cited by examiner

*Primary Examiner*—Peter C. English

(57) ABSTRACT

A cable adjustment device changes the effective length or tension of a control cable which extends between an actuating mechanism and device to be operated thereby. In the case of a bicycle, the cable adjustment device is coupled to a bicycle actuating mechanism such as a brake lever or a shifter to control a brake or a derailleur. The actuating mechanism has a base or stationary member and a movable member coupled to the base member for moving the control cable. In the preferred embodiment, the cable adjustment device is coupled to the base member. Specifically, a cable guide portion with an internal threaded bore is integrally formed with the base member. This bore threadedly receives an adjusting member which engages the outer casing of the control cable. A torsion spring is coupled between the adjusting member and the cable guide portion to overridably restrict rotational movement therebetween. Specifically, the adjusting member has one or more longitudinally extending channels which are selectively engaged by a nose portion of the torsion spring to control the rotational movement of the adjusting member.

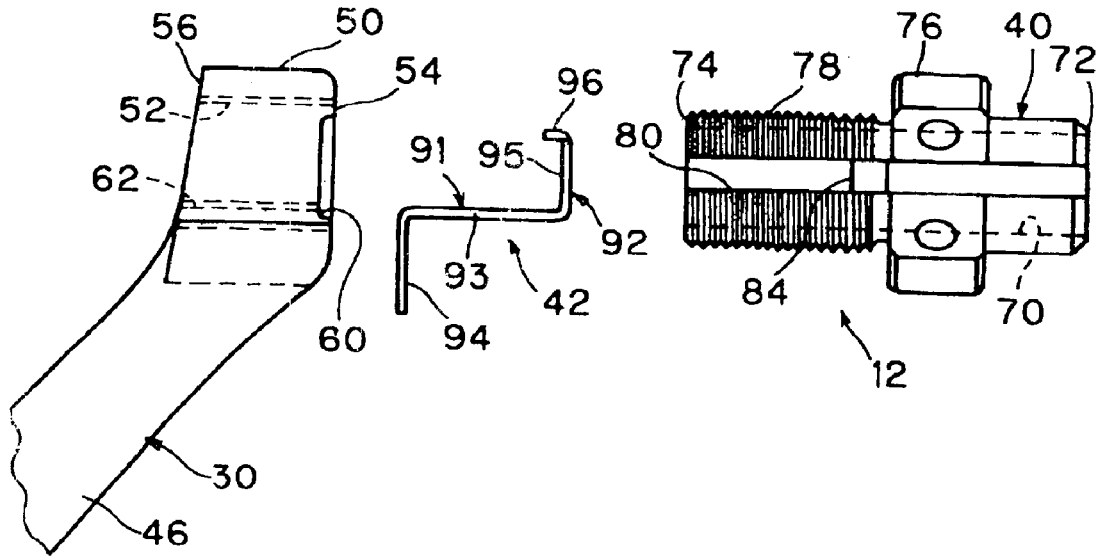

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are cancelled.

Claims 3, 4, 7, 8, 10, 11 and 14–17 are determined to be patentable as amended.

Claims 5, 6, 9, 12 and 13, dependent on an amended claim, are determined to be patentable.

New claim 18 is added and determined to be patentable.

3. A bicycle actuating mechanism [according to claim 2,] *comprising:*
   *a base member having a cable guide portion with a first open end, a second open end and a first bore extending longitudinally therebetween;*
   *an actuating element having a cable attachment point adapted to couple a cable thereto, said actuating element being movably coupled to said base member;*
   *an adjusting member having tubular portion with a third open end, a fourth open end and a second bore extending longitudinally therebetween, said adjusting member being rotatably coupled to said cable guide portion for axial movement during relative rotational movement between said tubular portion of said adjusting member and said cable guide portion of said base member; and*
   *an indexing spring disposed between said base member and said adjusting member, with a first section of said spring being nonmovably engaged with one of said members, and a second section of said spring extending from said first section with a free end of said second section being movably coupled relative to said first section to move in a transverse direction to said axial movement of said adjusting member, said free end of said second section being cantilevered relative to said first section, said second section of said spring being normally biased to movably engage a longitudinally extending channel formed in one of said members to overridably restrict rotational movement between said members,*
   wherein said spring is a torsion spring.

4. A bicycle actuating mechanism [according to claim 2,] *comprising:*
   *a base member having a cable guide portion with a first open end, a second open end and a first bore extending longitudinally therebetween;*
   *an actuating element having a cable attachment point adapted to couple a cable thereto, said actuating element being movably coupled to said base member;*
   *an adjusting member having tubular portion with a third open end, a fourth open end and a second bore extending longitudinally therebetween, said adjusting member being rotatably coupled to said cable guide portion for axial movement during relative rotational movement between said tubular portion of said adjusting member and said cable guide portion of said base member; and*
   *an indexing spring disposed between said base member and said adjusting member, with a first section of said spring being nonmovably engaged with one of said members, and a second section of said spring extending from said first section with a free end of said second section being movably coupled relative to said first section to move in a transverse direction to said axial movement of said adjusting member, said free end of said second section being cantilevered relative to said first section, said second section of said spring being normally biased to movably engage a longitudinally extending channel formed in one of said members to overridably restrict rotational movement between said members,*
   wherein said first section of said spring includes a longitudinal portion extending longitudinally within one of said bores of one of said members.

7. A bicycle actuating mechanism according to claim [2] *4*, wherein
   said second section of said spring has a bent portion for engaging said channel of one of said members.

8. A bicycle actuating mechanism according to claim [2] *4*, wherein
   said one of said members with said first channel has at least one additional longitudinally extending channel formed in one of said members and circumferentially spaced from said first channel that is selectively engaged by said second section of said indexing spring to restrict rotational movement between said members.

10. A bicycle actuating mechanism according to claim [2] *4*, wherein
    said channel is a longitudinally extending slot which is in communication with said bore of said one of said members.

11. A bicycle actuating mechanism according to claim [2] *4*, wherein
    said cable guide portion of said base member is threadedly coupled to said tubular portion of said adjusting member.

14. A bicycle actuating mechanism according to claim [2] *4*, wherein
    each said members includes a longitudinally extending passageway in communication with its respective said bore such that a cable can pass laterally therethrough and into said bores when said passegeways are aligned.

15. A bicycle actuating mechanism according to claim [2] *4*, wherein
    said actuating element is a lever which is pivotally coupled to said base member.

16. A bicycle actuating mechanism according to claim [2] *4*, wherein
    said actuating element is a part of a shifting mechanism.

17. A bicycle actuating mechanism according to claim [2] *4*, wherein
    said base member includes a clamp to fixedly couple to a handle bar.

*18. A bicycle actuating mechanism according to claim 4, wherein said spring is a torsion spring.*

\* \* \* \* \*